United States Patent [19]
Frankeny et al.

[11] 3,794,831
[45] Feb. 26, 1974

[54] APPARATUS AND METHOD FOR MONITORING THE OPERATION OF TESTED UNITS

[75] Inventors: Richard F. Frankeny, Austin, Tex.; Sidney D. Johnson, Longmont, Colo.

[73] Assignee: International Business Machines Corporation, Armonk, N.Y.

[22] Filed: June 1, 1972

[21] Appl. No.: 258,757

[52] U.S. Cl. ........................ 340/172.5, 340/174.1 B
[51] Int. Cl. ........................................... G11b 13/00
[58] Field of Search......340/172.5, 173 R, 173 RC, 340/174 A, 174.1 P, 174.1 R, 347 AD, 347 DA

[56] References Cited

UNITED STATES PATENTS

| | | | |
|---|---|---|---|
| 3,361,897 | 1/1968 | Rush | 340/172.5 |
| 3,559,181 | 1/1971 | Carlock et al. | 340/172.5 |
| 3,601,809 | 8/1971 | Gray | 340/172.5 |
| 3,611,314 | 10/1971 | Pritchard et al. | 340/172.5 |
| 3,696,341 | 12/1970 | Watts et al. | 340/172.5 |
| 3,131,383 | 4/1964 | Brandt | 340/174.1 R |
| 3,339,181 | 12/1967 | Singleton et al. | 340/174 A |
| 3,375,507 | 3/1968 | Gleim et al. | 340/174.1 R |
| 3,466,612 | 9/1969 | Myers et al. | 340/174 A |
| 3,469,257 | 9/1969 | Hoernes et al. | 340/347 DA |
| 3,614,751 | 10/1971 | Narisawa | 340/173 R |
| 3,641,509 | 2/1972 | DiVita et al. | 340/173 R |
| 3,662,380 | 5/1972 | Cargile | 340/347 AD |
| 3,713,113 | 1/1973 | Kohzuma et al. | 340/173 RC |

*Primary Examiner*—Paul J. Henon
*Assistant Examiner*—Michael Sachs
*Attorney, Agent, or Firm*—Gunter A. Hauptman

[57] ABSTRACT

Signals from a tested electronic unit are continuously stored in sequence on a rotating disc memory while the unit is monitored for errors. When an error occurs, substantially all the recorded signal sequences are displayed as an image on a CRO screen. A manual control selects portions of the stored sequences for display, scanning the image in accordance with manual speed and direction instructions. The manual instructions control stepping of a first counter which is compared for equality with a second counter tracking currently accessible disc locations. Equal comparison triggers the CRO horizontal scan to cause display of a desired and manually variable portion of the recorded signal sequences. Circuits provide pulse stretching and peak detection necessary to efficiently utilize the tester with a variety of tested units and displays.

11 Claims, 18 Drawing Figures

UNIT UNDER TEST 2

PULSE SHAPER 3

SINGLE SHOT (S.S.) 305,308

SYNC LOGIC 4

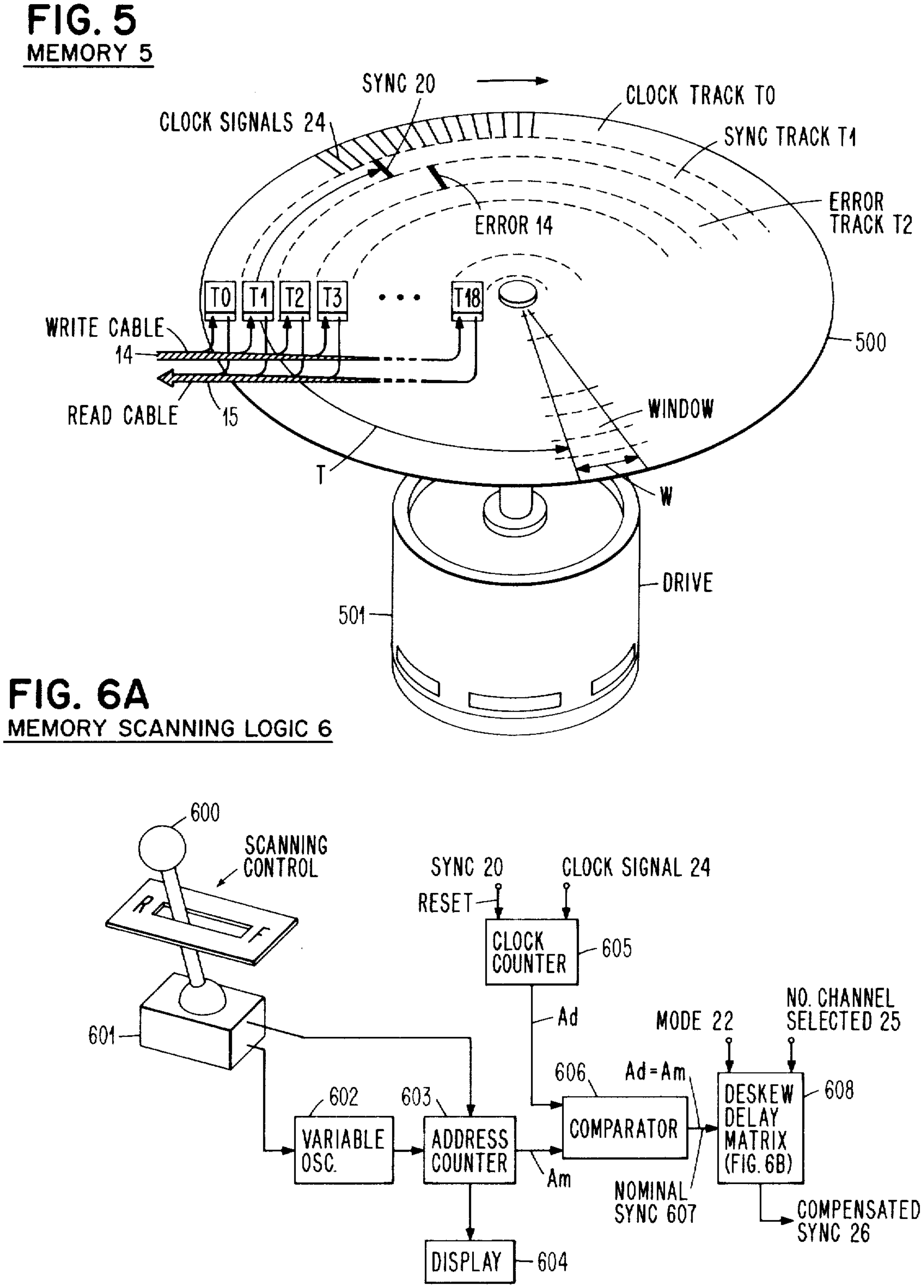
FIG. 5 MEMORY 5, FIG. 6A MEMORY SCANNING LOGIC 6

DESKEW DELAY MATRIX 608

ADDRESS COUNTER 603

CLOCK COUNTER 605

APPARATUS AND METHOD FOR MONITORING THE OPERATION OF TESTED UNITS

CROSS-REFERENCE TO RELATED APPLICATION

This invention is an improvement of the invention disclosed in the patent application filed in the name of R. Z. Watts and R. L Weiss, Ser. No. 94,661, filed Dec. 3, 1970, now U.S. Pat. No. 3,696,341 entitled "Signal Analysis," and assigned to the International Business Machines Corporation (IBM Docket No. B0970055).

BACKGROUND OF THE INVENTION

1. Field of the Invention

This invention generally relates to electronic information processing and more particularly to the retrieval of transient electronic signals for analysis.

2. Description of the Prior Art

Complex mechanical and electronic devices will often operate correctly for long periods only to be interrupted by intermittent transient faults. Such faults are extremely difficult to detect due to the large number of points in the device which must each be monitored for the entire period preceding a fault. Absent prior experience with identical failures in a particular device, analysis of the cause of the fault is, as a practical matter, impossible unless the fault itself can be observed. Examples of such temporary faults and their possible causes are: the loss of television set synchronization caused by a defective resistor; stalling of an automobile motor during acceleration as a result of a capacitor short; an electronic digital computer trigger being reset by a line voltage surge; etc. A conventional prior art solution to the problem of identifying and analyzing such faults has been to connect a large number of standard test instruments and meters to every probably relevant point in the device and then watching or recording the readings until a fault occurs. In the case of the computer, for example, this requires a recording power line voltage meter and a large number of other interpretive recording meters to aid in eventually identifying the one trigger which is unusually sensitive to voltage surges. Such a solution is very expensive and time consuming.

Also in the prior art, it has been suggested that large numbers of signal points may be continuously monitored and directly recorded without interpretation for subsequent editing, display, and analysis after the occurrence of a fault. An advanced form of this analysis technique is described in the above-referenced Watts et al application and in an article in the IBM TECHNICAL DISCLOSURE BULLETIN, Volume 13, Number 8, Jan., 1971, entitled "Transient Event Observation," by R. Z. Watts and R. L. Weiss, at pages 2,370 and 2,371. There, waveforms from a system under test are stored in a multichannel revolving memory until an error in the system is detected. After a time, fixed in part by the memory capacity, new waveforms are stored in place of old ones. When the error is detected, recording stops, and the recorded waveforms are made available to a display for analysis. Ideally, during analysis, each waveform is compared with every other simultaneously occurring waveform to help identify correlations pinpointing a fault. In the referenced Watts et al application, this is achieved by displaying portions of a plurality of waveforms and manually adjusting the portions displayed. In one embodiment therein, it is suggested that the recorded waveforms may be sequentially presented to a storage CRO by the operator to display the waveforms as lines on the CRO screen in any order desired. Portions of the displayed lines are then selected by a counter, containing a preset quantity, which is stepped after the occurrence of an error. After the counter is stepped a number of times determined by the preset quantity, a counter output signal triggers the start of a CRO display horizontal scan which will continue for a "window" period predetermined by the display. The point during the recorded waveform at which display starts is varied when the operator changes the quantity preset in the counter.

SUMMARY OF THE INVENTION

In this invention, analysis of transient faults is facilitated by providing a display of selected or emphasized portions of fault-related signals which may be scanned at manually varied rates.

A unit under test is connected to the testing system by monitoring probes which sense sequences of selected data and error signals in the tested unit. The signal sequences are continuously stored in a memory along with associated control signals. When an error signal is sensed in the tested unit, recording is terminated after a predetermined delay to preserve those data signal sequences which are related to the error. The recorded signal sequences are made available to a display in a preselected order so that each horizontal trace (line) on the display corresponds to one monitored signal sequence from the tested unit. Depending on the display adjustment, all, or only part, of the entire recorded portion of each signal sequence will appear on the screen. A manual control indicates desired display emphasis, and a portion ("window") of the displayed signal sequences is accordingly emphasized. Analysis of the fault is facilitated by preselecting for adjacent display, on adjacent lines, those signal sequences from the tested unit which are suspected of relating to the error, scanning the displayed signals to correlate the signals from selected sequences set by set, and then concentrating on only the most suspect signals. Additional circuits permit a wide variety of signals from the tested unit to be monitored, detected, and accessed after storage. The invention operates on either analog or digital signals.

In one embodiment, signals are stored on 19 tracks of a revolving disc. Signal sequences from the tested unit are monitored by up to 16 data-monitoring probes and one error-indicating monitoring probe, one additional track being reserved for clock signals and still another for synchronization signals. Each of the 17 tested unit signal sequences passes through a pulse shaper which, in the case of digital signals, includes a series of delay and logic circuits for providing output signals meeting predetermined width requirements substantially independently of input signal widths, up to a predetermined signal width. When the input signal width is equal to or greater than this predetermined width, the output and input signals widths are equal. Clock signals are continuously written on the disc clock track, while the tested unit is monitored, until a predetermined time after an error is sensed when, instead, a single synchronization signal is written on the synchronization track. The error signal, written on the error track at the time the error occurs, is subsequently made available along with the data tracks to the display.

All recording stops when the synchronization signal is recorded. The 17 data and error tracks then sequentially supply signals to a storage CRO display capable of simultaneously displaying the signals as an image of scanned lines on the face of a CRT. The order of display is determined by preset switches, scanned by a counter, stepped once for each 32 line scans of the CRO, which indicates the line currently displayed on the CRO. Each CRO line is scanned 32 times for maximum brightness. The CRO will start each line scan of a signal sequence as a function of the position of the synchronization pulse on the synchronization track of the disc, relative to the recorded data, as follows: (1) The recorded synchronization signal resets a clock counter, which is then stepped by the recorded clock signals to indicate at the clock counter output each disc address location currently available to the CRO; (2) A separate address counter is continuously stepped by a variable oscillator at a speed and in a direction determined by a manual scanning control; (3) A comparator connected to both counters supplies an equality signal at varying times determined by the manual operation of the scanning control; (4) The equality signal, representing a given desired relationship between the manual control and the disc locations available to the CRO, ultimately supplies synchronization pulses used to vary the start of scanning of all lines on the CRO screen.

Thus, each synchronization pulse starts a scan on the CRO corresponding to the disc location currently specified by the address counter and ending after a time determined by an (adjustable) CRO sweep frequency. The manual control passes portions of all selected signal sequences past the CRO display "window" at any desired rate. If desired, signal sequences may be displayed in their entirety and the window instead emphasized by brightening portions of the screen, underlining selected signals, supplying cursors, or otherwise highlighting the manually selected portions of the displayed signal.

The foregoing and other features and advantages of the invention will be apparent from the following more particular description of a preferred embodiment of the invention, as illustrated in the accompanying drawings.

THE DRAWINGS

FIG. 1, a block diagram of the invention, shows a testing unit connected to apparatus for monitoring the operation of the tested unit.

FIG. 5 shows a typical revolving memory which may be used in the invention.

FIG. 6A is a diagram showing the embodiment of the manual memory scanning logic used in describing the invention.

GENERAL DESCRIPTION OF PREFERRED EMBODIMENT (FIG. 1)

Figure 1:
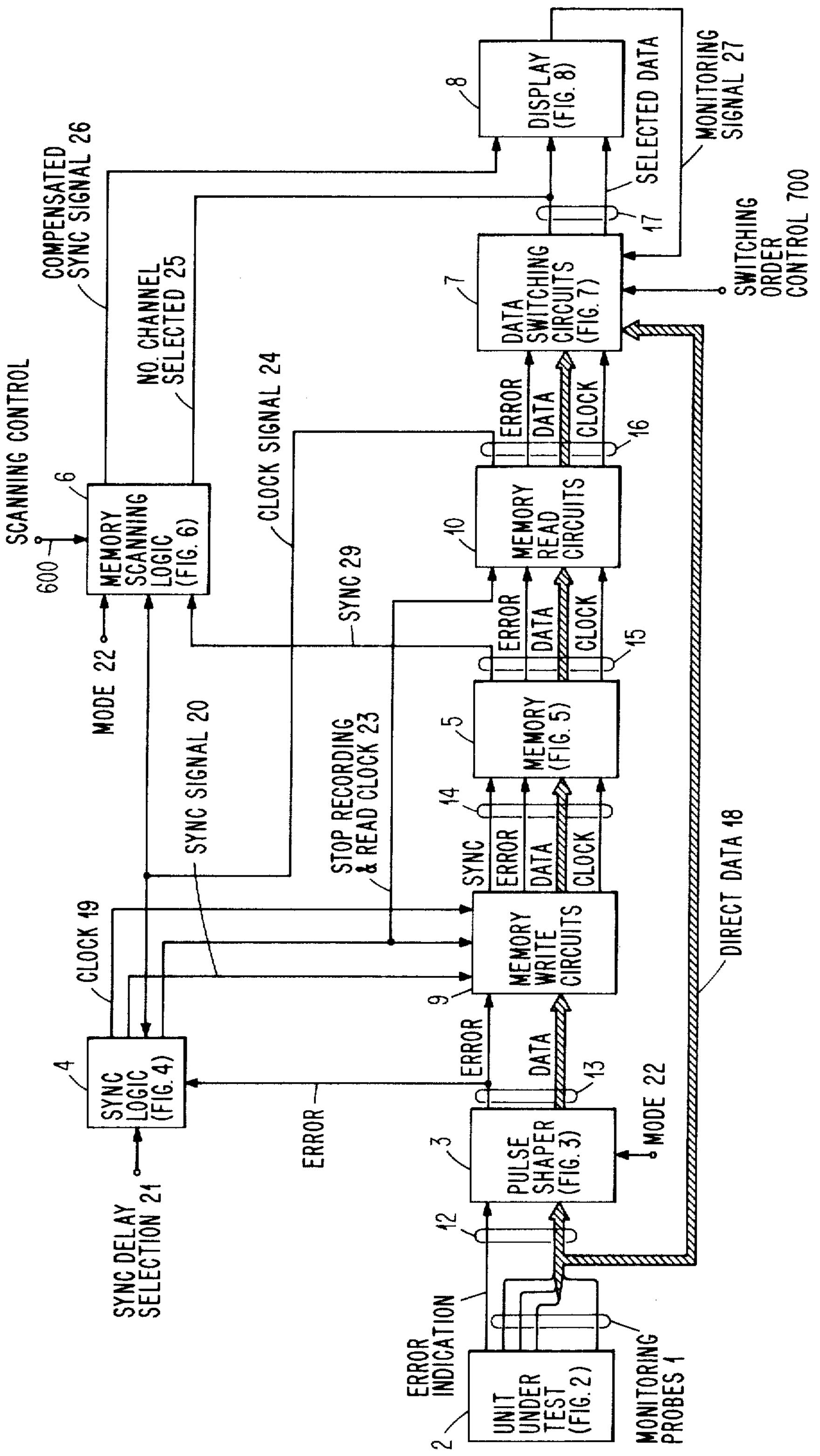

Referring first to FIG. 1, the general structure of an embodiment of the invention will be explained. The invention is an improvement over the previously referenced application Ser. No. 94,661 and generally described in the previously referenced IBM TECHNICAL DISCLOSURE BULLETIN article Jan., 1971, pages 2,370 and 2,371, both of which are hereby incorporated herein.

Monitoring probes 1 are connected to a unit under test 2 for the purpose of monitoring sequences of signals on preselected data lines from the unit under test 2 and an error indication occurring in the unit under test 2. Bus 12 supplies these signals to a pulse shaper 3 capable of operating in a number of modes (i.e., digital or analog) specified as signals at a mode input 22 and also on a bus 18 for direct transfer to data switching circuits 7 and a display 8 via a direct data bus 18 if specified by a switch in the circuits 7. The signals on bus 13 are also supplied for storage in a memory 5 via memory write circuits 9 and bus 14. The memory write circuits 9 are controlled by synchronization logic 4 in accordance with a synchronization signal on line 20 derived from a pulse shaped indication originating in the unit under test 2. Signals on a synchronization delay selection line 21 vary the time relationship between the error and synchronization signals. Clock signals on line 19 are independently generated and control system timing.

Normally the memory write circuits 9 continuously transfer data on bus 13 to bus 14 for entry into the memory 5, and the synchronization logic 4 supplies clock signals on line 19 for recording in the memory. Upon the occurrence of an error in the unit under test, the memory write circuits in addition transfer an error signal to the memory, and subsequently, the synchronization logic 4 derives a synchronization signal from the error signal and supplies a synchronization signal on line 20 for recording in the memory. At this point, a signal on line 23 from the synchronization logic 4 terminates all recording via bus 14, and all the previously recorded information, available on bus 15, is received by memory read circuits 10 for utilization by units connected to bus 16 to memory scanning logic 6.

While, loosely speaking, "data" is said to be stored in and removed from, a memory; in actuality, magnetic (or other) manifestations of electrical signals are stored therein.

The memory scanning logic 6 is operated by a scanning control 600 and clock signals on line 24 to variably derive from the recorded synchronization signal read on line 20 a delayed and compensated synchronization signal on line 26. Additional compensation delay is inserted in accordance with signals on lines 25 and 22.

The data switching circuits 7 sequentially supply information on bus 16 for simultaneous recording by display 8 via bus 17. Switching order control 700 permits data signal sequences on bus 16 to appear on bus 17 in any desired preselected order.

Each compensated synchronization signal on line 26 times the start of recording on a multi-line display 8 of a line of selected data received on bus 17 from data switching circuits 7. Scanning control 600 varies the timing of the compensated synchronization signal on line 26 relative to the start of signal sequences on bus 17 and thus causes the display to start recording at different points in the sequences. The display records a predetermined amount of information following the start of recording. Thus, scanning control 600 causes a window to scan across the display 8. The display operates at a speed considerably higher than the selected data rate. This permits it to simultaneously record a plurality of lines and to record each line a plurality of times for added emphasis. The particular number of the current line recorded is derived by counting the number of monitoring signals on line 27.

DETAILED DESCRIPTION OF PREFERRED EMBODIMENT

(FIGS. 2-8)

Figure 2:
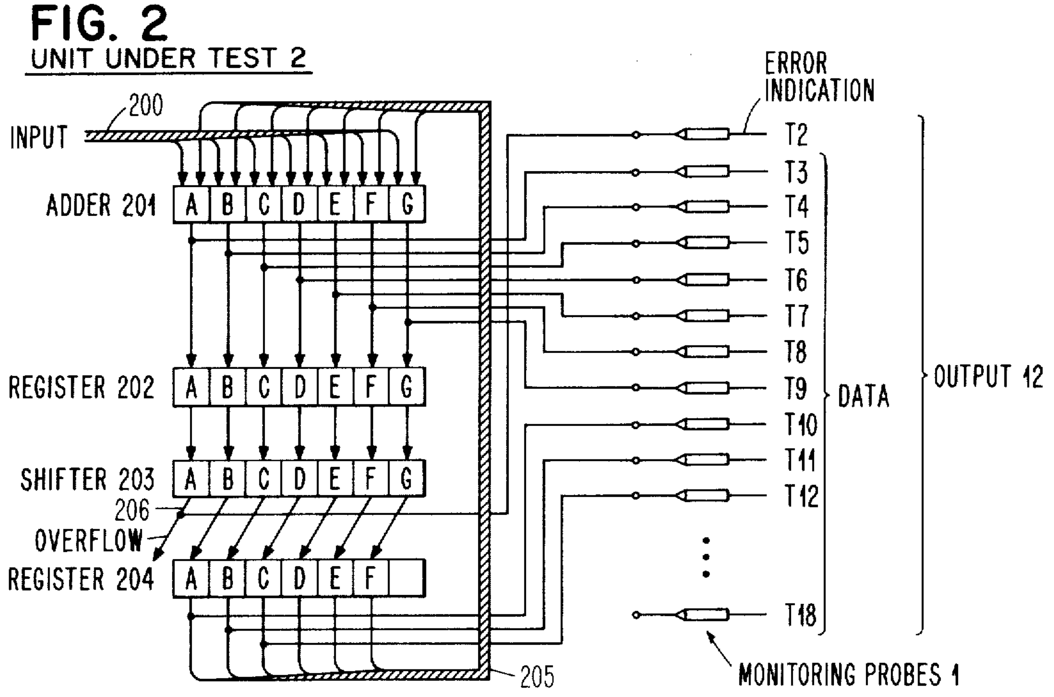
FIG. 2 shows a section of a typical tested unit.

Unit Under Test (FIG. 2)

Referring now to FIG. 2, structure of the unit under test 2 may, for purposes of illustration, be a central processing unit of a computer including logical circuits for conventional binary multiplication by successive addition and shifting. A 7-bit operand A–G (A being the lowest order) is supplied on input bus 200 to an adder 201 having two inputs. The other input is supplied on a cable 205 from a register 204 storing a previous 7-bit partial product A–G. The partial product and the input on bus 200 are combined in the adder 201 and supplied as a sum to the register 202. Shifter 203 shifts each order one position left and enters it into register 204 as a new partial product. During multiplication, successive operations eventually cause an overflow output from position A of shifter 203. It is possible for an electronic failure of a circuit to cause an overflow 206 to occur at an improper time. For example, if position A of register 204 cannot be initially reset to the 0-bit state, an overflow will incorrectly occur on line 206 at an early stage in a multiplication following any operand having a low order 1-bit. In order to identify the cause of this overflow, 11 of 17 monitoring probes 1 are shown connected to points in the unit under test 2. These probes may, for example, be standard Tektronix Model 6053A oscilloscope probes and may be retrieved as described in the IBM TECHNICAL DISCLOSURE BULLETIN article entitled "Mechanism for Retrieving and Storing Probe Cables" by R. D. Dennett, published Nov., 1971, page 1,845. The probes are designated T2-T18 in accordance with lines T2-T18 of output 12. For illustration only, 16 probes T3-T18 are allotted for data, though only some are used, and a 17th probe T2 is connected to an error indication point, the overflow line 206. However, any number of probes may be provided and connected, and more than one error indication may be monitored. With the choice of probes as shown, the occurrence of an overflow indication from position A of shifter 203 can be analyzed with respect to all the outputs A–G from the adder 201, all the inputs A–G to the register 202, and outputs A–C of the register 204. While any number of probes may be provided and connected to additional points on the unit under test 2, it can be seen that these would be sufficient to identify the cause of the incorrect overflow.

PULSE SHAPER (FIGS. 3A-3C)

The 17 pulse shapers 3 to which the unit under test 2 is connected by the probes T2–T18 will be explained with reference to the logic diagrams of FIGS. 3A and 3B and the waveform diagram of FIG. 3C. Pulse shapers permit different types of units to be tested. For example, it is desirable to test units supplying digital as well as analog signals, though different types of detection circuits are normally necessary to utilize these two different types of signals.

Figure 3A:
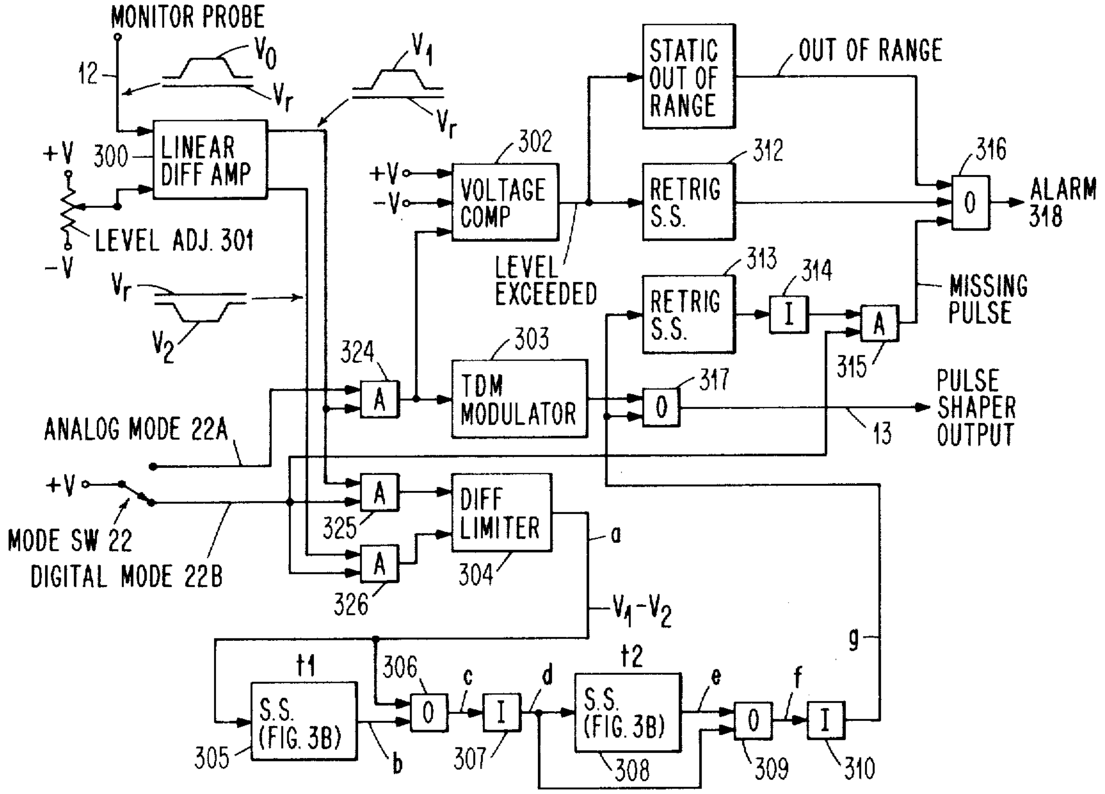
FIGS. 3A and 3B are, respectively, logic diagrams of a pulse shaper of a single-shot utilized in the pulse shaper.

Referring first to FIG. 3A, there is provided a mode switch 22 operable to supply a voltage +V to a line 22A in the analog mode (for example, when signals are received directly from a magnetic tape read head) and to a line 22B in the digital mode (for example, signals from control logic or registers). Each line T2–T18 from the monitoring probes 1 output 12 is supplied to a commerically available linear differential amplifier 300 such as a Tektronix 7A12 preamplifier. In this invention, the amplifier 300 is used for both digital and analog signals. A level adjustment 301 permits input signal $V_0$, and, therefore, output signals $V_1$ and $V_2$, to be adjusted relative to a selected reference voltage $V_r$. If $V_0$ is equal to 0 volts and the outputs $V_1$ and $V_2$ are differentially offset by an amount equal to $-V_r$ volts, then an applied signal will create differential outputs $V_1$ and $V_2$ which will cross at $+V_r$ volts. Thus, both balanced outputs from the linear differential amplifier 300 are utilized for digital signals in the digital mode when the mode switch 22 is in the position 22B, and only one of the outputs is utilized when the mode switch 22 is in the analog mode position 22A. In the analog mode, AND (analog gating) circuit 324 is enabled to connect a voltage comparator 302 and a time duration modulator 303 to receive signals $V_1$. The TDM modulator 303 generates pulse outputs on line 13 via OR circuit 317. The modulator 303 may be any standard modulator; for example, the Data Disc, Inc. period modulator system. The voltage comparator 302 determines whether the signal $V_1$ is within the limits +V and −V and operates a retriggerable single-shot 312 to cause an alarm 318 via OR circuit 316 if the signal is out of range. In the digital mode 22B, a differential limiter 304 is connected to both signals $V_1$ and $V_2$ by AND gates 325 to supply a signal a representing the difference $V_1$-$V_2$ to a series of logic circuits 305–310 which shape this signal to meet predetermined criteria. The shaped signal $g$ is supplied via OR circuit 317 to the output 13 and to a retriggerable single-shot 313. If the signal $g$ is not changing states at least once per memory length (for example, 1 disc revolution) for a fixed duration, there will be an input to inverter 314 which is gated through AND circuit 315 to OR circuit 316 to indicate a missing pulse and thus an alarm 318.

Figure 3B:
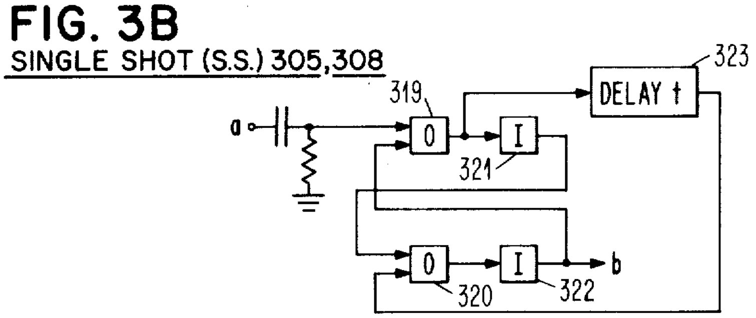
Figure 3C:
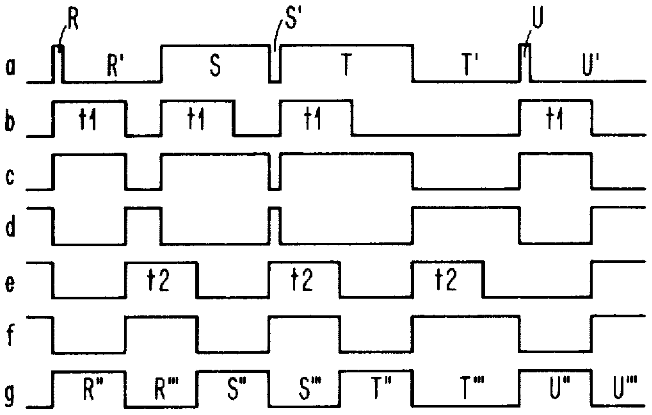
FIG. 3C is a waveform diagram of signals present in specified points of the pulse shaper.

The pulse shaping logic circuits 305–310 include two single-shots 305 and 308 shown in more detail in FIG. 3B. Each single-shot receives a digital data signal at input $a$ and provides an output at b which is timed to start with each positive transition of the input signal a and continue for a given duration fixed by a delay circuit 323. Input signals a, differentiated by a capacitor resistor combination, place a bistable circuit made up of OR's 319 and 320, inverters 321 and 322 in a set state. The circuit is then reset after time *t* via delay circuit 323. The single-shot 305 is directly activated by positive transitions of the input *a*, and the single-shot 308 is activated by negative transitions of signal *a* received through OR circuit 306 and inverter 307. Together, the two single-shots 305 and 308 provide a timed output *g* having a given positive duration *t*1 and negative duration *t*2. For example, referring to FIGS. 3A and 3C together, an input signal *a* has positive portions R, S, T, and U and negative portions R′ , S′, T′, and U′. The single-shot 305 provides a series of positive pulses at output *b* each having a duration *t*1 and each starting with a positive transition of signal R, S, T, and U. OR circuit 306 combines the input a and the output b to form a series of pulses *c* wherein all input a pulses shorter than duration *t*1 are expanded and all input pulses longer than *t*1 are their normal length. Inverter 307 supplies complemented signals *d* to single-shot 308 which generates output signals e each having a duration *t*2 and each beginning with a positive transition in the signals *d* from the inverter 307. Since the signals *d* supplied to single-shot 308 are an inverse function of the original signals *a*, the fixed duration *t*2 begins at the lagging edge of each timed signal bit. Thus, a signal f is supplied from OR circuit 309 representing an inverted and timed version of input signals *a*. An inverter 310 then supplies at output *g* a sequence of signals timed so that each positive portion R″, S″, T″, and U″ corresponding to positive input portions R, S, T, and U, but having a duration of at least *t*1, and each negative signal R″, S″, T″, and U″ corresponds to one of the negative input signals R′, S′, T′, and U′, except that it has a duration of at least *t*2. It can be seen that the transitions between negative and positive signals, for example R′ and S′ as compared with R″ and S″, have been moved due to the expansion of short signals R′.

Figure 4A:
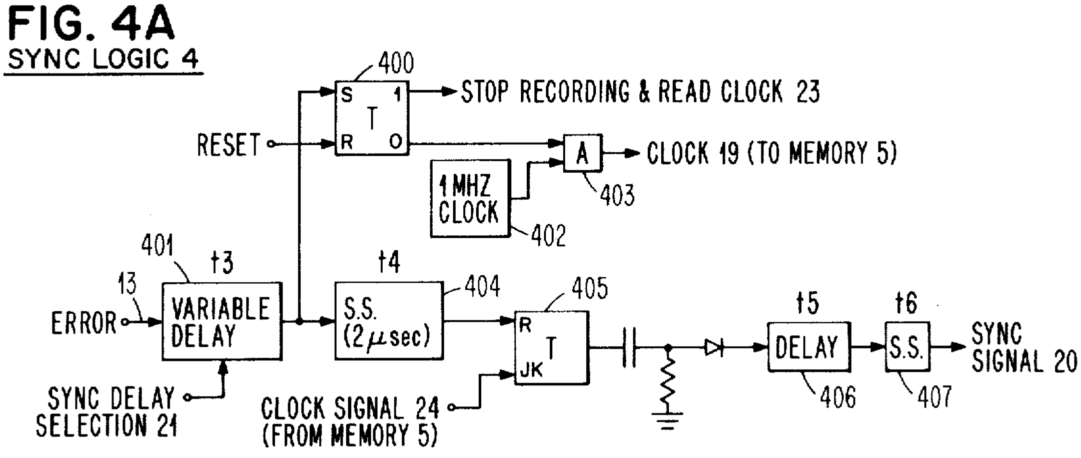
FIG. 4A is a logic diagram showing synchronization logic usable in the invention.
Figure 4B:
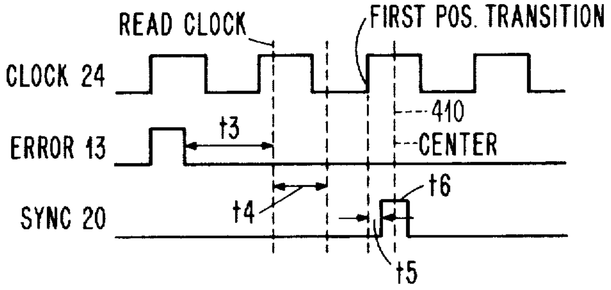
FIG. 4B is a waveform diagram showing signals present in the synchronization logic of FIG. 4A.

Synchronization Logic (FIGS. 4A–4B)

The synchronization logic 4 for generating synchronization signals will now be described with reference to FIGS. 4A and 4B. The purpose of this logic is to generate a fixed width synchronization signal on line 20 near the center of a recorded clock signal 24 following the occurrence of an error signal 13 by a preselected delay. Error signals received on line 13 are transferred through a variable delay circuit 401 adjustable to a delay duration *t*3 by signals on synchronization delay selection line 21 over any range desired. In this embodiment, delay 401 is normally set at *t*3=100 microseconds, and may be adjusted to 4 milliseconds or 8 milliseconds. The delayed error signal which sets trigger 400 to the one state to signal "stop recording and read clock" on line 23. Setting the trigger activates AND circuit 403 which supplied signals from a 1 megahertz clock 402 to memory 5 on line 19. The error signal on line 13 thus terminates further recording after a delay *t*3. At this time, the delayed error signal also causes a single-shot 404 to pulse *t*4 (in this embodiment, 2 microseconds) which releases the reset on trigger 405. The trigger 405 is then set upon the first positive transition from the recorded clock signals on line 24. Any commercially available master slave J–K flip-flop may be used as trigger 405. A differentiating positive pulse selection circuit supplies the positive edge of the trigger output to delay 406 which causes single-shot 407 to supply a *t*6 duration (in the range of 100 nanoseconds) synchronization signal after a delay *t*5 (which should be one-fourth of a clock cycle). The operation of the circuit is further evident from FIG. 4B showing the recorded clock signals 24 and an error on line 13 determining the timing of synchronization signal on line 20 with reference to the center of clock pulse 410 on line 24.

Memory (FIG. 5)

Referring now to FIG. 5, a typical memory 5 usable in the invention will be described. The particular memory shown is the 4000 Series Disc Recorder System manufactured by Data Disc, Inc., 686 West Maude Avenue, Sunnyvale, California 94086. This system records signals on 19 tracks of disc 500 rotated at 3,600 rpm by a drive 501 and includes memory write circuits 9 and memory read circuits 10. Disc recording is also described in the previously referenced Watts et al., patent, over which this invention is an improvement, and in Stevens et al., U.S. Pat. No. 3,134,097, "Data Storage Machine," issued on May 19, 1964, to the International Business Machines Corporation on an application filed Dec. 24, 1954. Any conventional read/write circuits may be used in the circuits 9 and 10; for example, those shown in FIG. 26 of the Stevens et al., patent. Nineteen magnetic read/write heads T0–T18 record signal sequences from write bus 14 and made available on read bus 15 recorded signals as they pass under the heads. Any magnetic device, such as a disc, drum, or magnetic tape drive, may be used, or if desired, a core memory or other electronic storage system may be substituted. The illustrative disc 500 drive shown revolves clockwise once every 16.67 milliseconds and has 19 magnetic read/write heads T0–T18. Any number of read/write heads may instead be provided. For example, one head may be mounted on a movable arm, separate sets of heads may read and write, etc. In this embodiment, each of the 19 heads is associated with one of 19 tracks T0–T18. Track T0 stores 16,667 clock signals 24 for every revolution supplied at 1 megahertz by the synchronization logic 4 line 19 to the memory write circuits 9; track T1 stores a synchronization signal generated on line 20 by the logic 4; track T2 holds an error signal received on bus 14; and tracks T3–T18 store sequences of data signals in discrete locations also received from this bus. As previously described with reference to FIGS. 4A and 4B, an error indication from the unit under test first causes an error to be recorded on track T2 and then, later, is followed by the writing of a synchronization signal on track T1. Memory scanning logic 6, to be explained below with reference to FIG. 6, scans a window *w* displaced from the synchronization signal by a variable distance T.

Figure 6B:
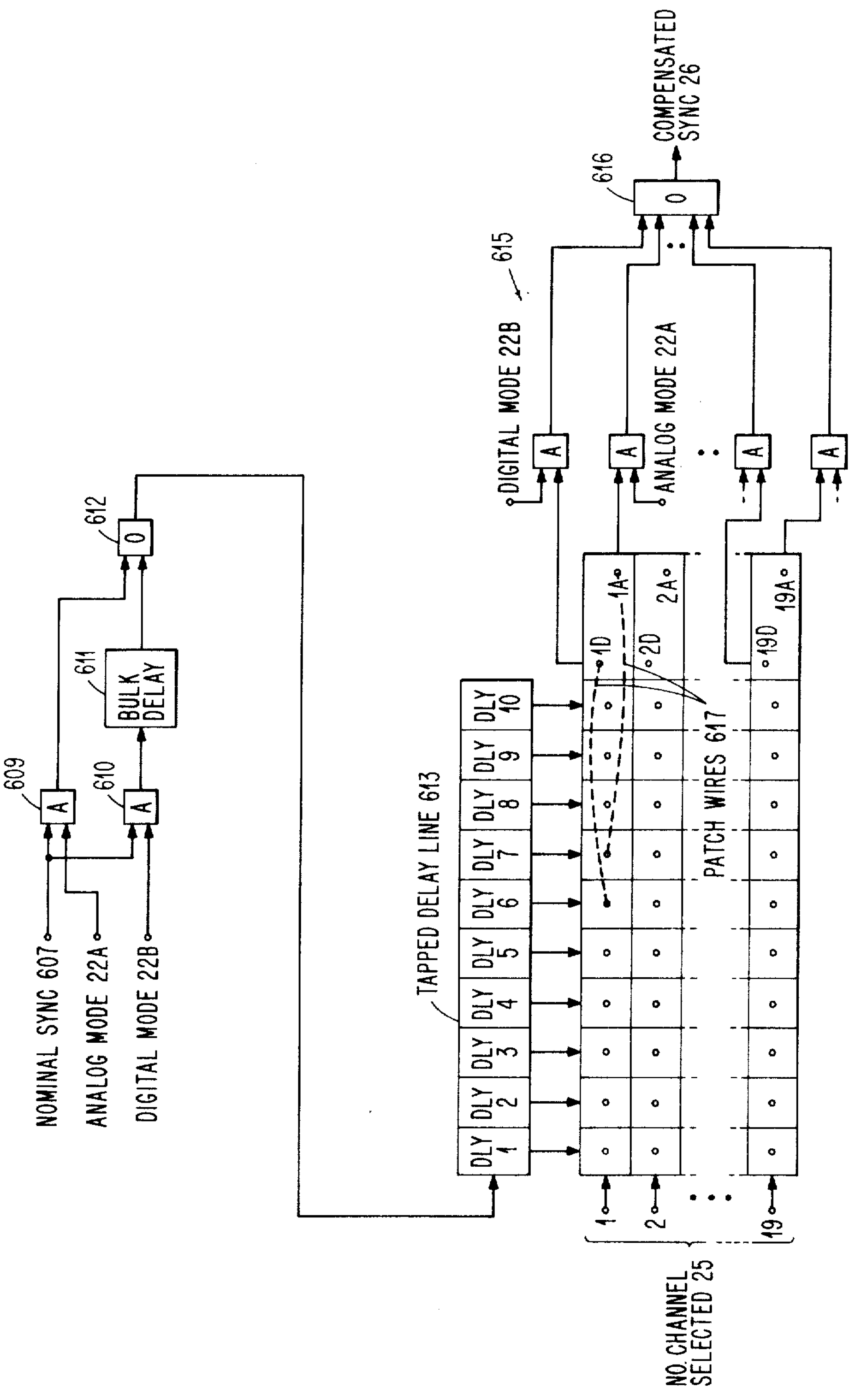
FIG. 6B shows details of the deskew delay matrix in FIG. 6A.

Memory Scanning Logic (FIGS. 6A–6B)

The memory scanning logic 6 used to scan the memory 5 and thus provide a scannable image on display 8 will now be explained with reference to FIGS. 6A and 6B. A manual scanning control 600 causes a transducer 601 to supply an analog signal to a variable oscillator 602 and a forward/backward (*f*/*b*) indication to address counter 603. The scanning control 600 may be constructed in the manner of the one described in the IBM TECHNICAL DISCLOSURE BULLETIN, Jan. 1972, page 2,341, or any other transducer capable of indicating as a signal the amount and direction of a physical position. The variable oscillator 602 output signal frequency to address counter 603 is changed as a function of the position of the handle 601 from 0 to about 2 KHz per second in this particular embodiment. The output Am of address counter 603 supplies to a comparator 606 addresses, depending on the oscillator frequency, ranging from 0 to 2,000 addresses per second. The comparator 606 also receives an address Ad from a clock counter 605 operated by the clock signals 24 recorded on the rotating disc at about 1 MHz. The clock counter 605 is reset each time that the synchronization signal 20 recorded on the disc 500 passes head T1. Therefore, clock counter 605 sequentially supplies a series of 16,667 addresses starting with address 0 at the synchronization point and progressing to address 16,666 before the counter is reset. The comparator 606 looks for the equality Ad=Am which indicates that the disc has revolved to a location specified by the address counter 603. The equality indication from the comparator 606 is supplied as a nominal synchronization signal 607 to a deskew delay matrix 608 which supplies a signal to the display 8 delayed as a function of compensation factors. Referring to FIG. 6B, circuit delays peculiar to each channel and the mode chosen for that channel are compensated for by inserting 1 of 10 equalizing delays. The deskew delay matrix 608 routes the nominal synchronization signal 607 through either AND circuit 609 or 610 depending upon the predetermined mode of operation. In the digital mode 22B, the nominal synchronization signal 607 is transmitted via OR circuit 612 directly to a 10-position tapped delay line 613. In the analog mode 22A, a bulk delay 611 is inserted in the circuit. The tapped delay line 613 propagates the OR circuit 612 output across columns 1–10 of a matrix. Depending on the particular one of 19 channel rows identified by the number channel selected lines 25 from data switching circuits 7, outputs from selected crossover points tapped by patch wires 617 result in compensated synchronization signals on line 26. AND circuits 615 are operable in the digital mode to gate signals from patch wire terminals 1D–19D and 1A–19A in the analog mode. Thus, each compensated synchronization signal 26 is delayed as a function of the associated channel and mode.

Figures 7, 8:
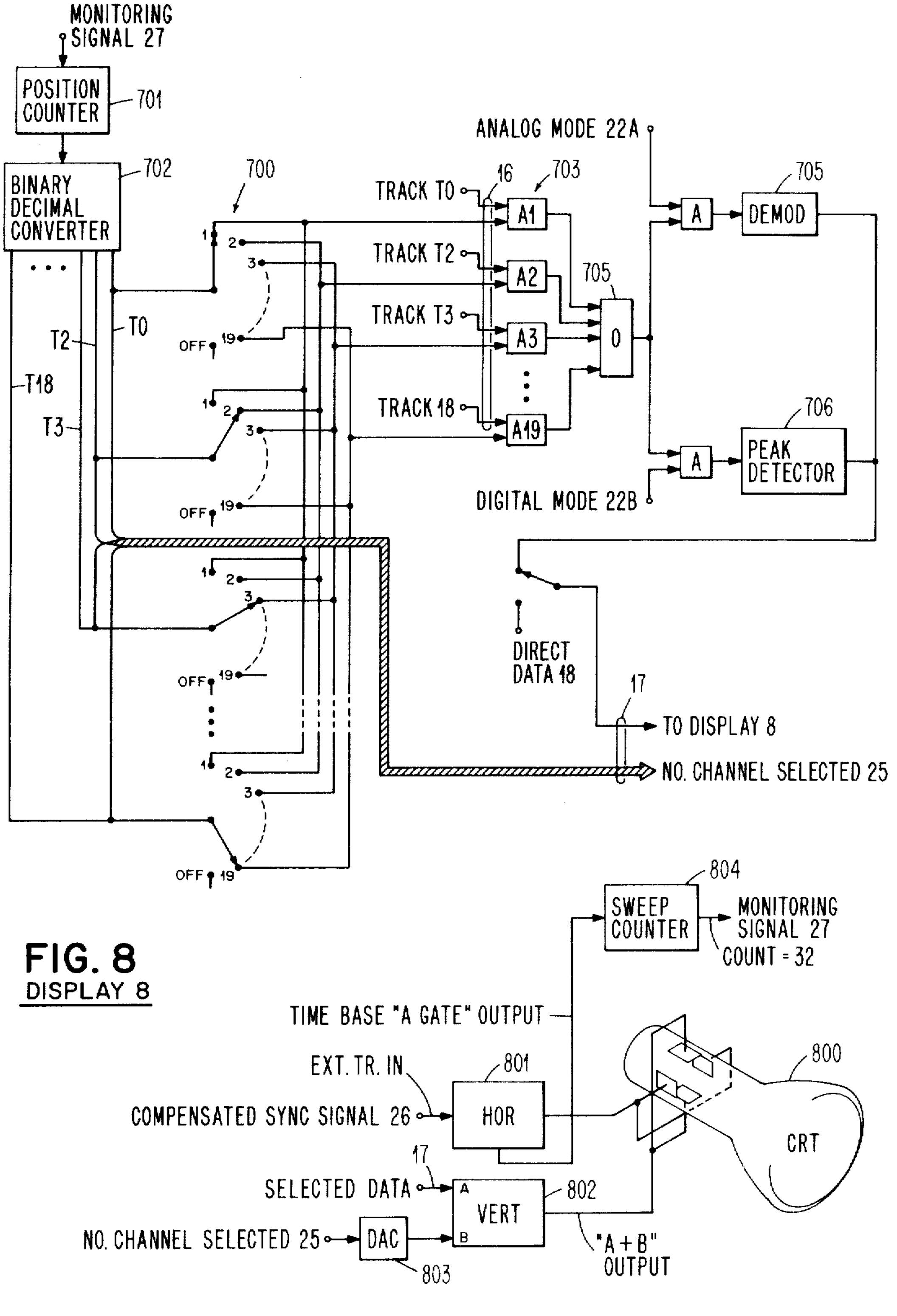
FIG. 7 is a logic diagram showing data switching circuits which may be used with the invention.
FIG. 8 is a diagram of a typical storage CRO display.

Data Selection Circuits (FIG. 7)

FIG. 7 illustrates the data switching circuits which permit any disc track to be switched to appear on any line of the display 8. A monitoring signal 27 from the display 8 identifies each new line on the display. Position counter 701 (conventionally designed as described in R. K. Richards' Arithmetic Operations in Digital Computers, Chapter 7, D. Van Nostrand Company, Inc., 1955) counts the number of monitoring signals 27. Binary decimal converter 702 (conventionally designed as described in Keister, Ritchie and Washburn, The Design of Switching Circuits, Section 12.5 et seq, D. Van Nostrand Company, Inc., 1951) indicates on one of 19 lines T0–T14 the current display line. The number of the display line (or "channel") currently selected is identified on bus 25 to the memory scanning logic 6 and the display 8. Nineteen manually selected switches 700 may each be prepositioned to any one of 19 positions to supply the binary decimal converter outputs T0 through T18 to any one of AND circuits 703. Data from tracks T0 and T2–T18, are then gated through the AND circuits 703 one at a time in accordance with the converter 702 outputs and transferred through OR circuit 704 to the display 8. Demodulation circuit is used in the analog mode 22A and peak detector 706 in the digital mode 22B. The demodulator may be any type of analog demodulator, for instance, the period demodulator manufactured by Data Disc, Inc., and the peak detector may be any conventional peak detector, for example, the peak detector disclosed in the June, 1972, issue of the IBM TECHNICAL DISCLOSURE BULLETIN article at Page 22, entitled "Recorded Signal Detection" by R. F. Frankeny and D. E. Norton, may be utilized.

Display (FIG. 8)

Referring now to FIG. 8, a typical display usable with the invention is shown. The display 8 may comprise any type of display, *x–y* recorder, computer analyzer, information handling system, or the like. For illustration only, a cathode ray tube type display 800 and specialized associated circuitry will be described. Any of a large number of commercially available CRT devices may be used. For example, a Hewlett-Packard 181A storage cathode ray oscilloscope CRO. The storage CRO receives a sequence of selected data signals from line 17 to the A input of vertical amplifier 802 and displays them in physically different positions on the face of the CRT 800. The CRT line or position on which each sequence is to be displayed is specified by digital-to-analog converter 803 in accordance with signals on the number channel selected line 25 supplied to input B of vertical amplifier 802 from the data switching circuits 7. Sweeping across the CRT face is accomplished by a horizontal sweep beginning at the time indicated by an external trigger input (on compensated synchronization signal line 26) and ending after an internally adjustable period. The sweep period is adjustable over a wide range, for example, from 500 nanoseconds to 20 milliseconds. A sweep counter 804, connected to a sweep output of the storage CRO, monitors the number of sweeps of the horizontal amplifier 801 and supplies a monitoring signal output on line 27 when there have been 32 brightening sweeps. The counter may be similar in design to the position counter 701.

Description of Operation of Preferred Embodiment

General Operation of Memory Scanning Logic (FIGS. 9A–9E and 10)

The operation of the FIG. 6 memory scanning logic 6 and its effect on the memory 5 and display 8 will be more particularly described with reference to FIGS. 9A–9E, and a typical example of the operation will be illustrated with reference to FIG. 10. In the following description, and occasionally elsewhere in this specification, timing and address designations are rounded off for simplicity. Hereinafter, the memory 5 will be described as taking 16 milliseconds for one revolution; whereas, its speed of 3,600 rpm more accurately requires 16.667 milliseconds for a revolution. Other quantities derived from this figure, such as disc storage capacity, are similarly simplified.

Figure 9A:
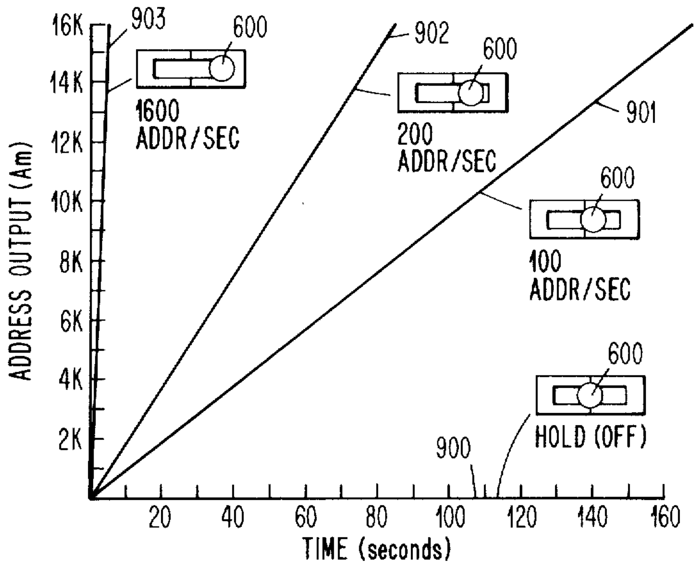
FIGS. 9A–9E are graphs generally illustrating operation of the manual memory scanning logic, memory, and display.

Referring first to FIG. 9A, the graph shows the relationship of the scanning control handle 600 to addresses Am supplied by the address counter 603. The variable oscillator 602 may be adjustable over a range from 0 to approximately 2 KHz although any range appropriate for stepping the address counter at a desired rate may be chosen. With the handle 600 at dead center, as shown for line 900, the oscillator 602 is turned off or disconnected from the address counter 603, so that over any period of time, the current address output (for example 0) of the address counter is held constant. As the handle 600 is moved forward (right), the oscillator 602 frequency increases from 0 toward 2 KHz. As shown by line 901, the counter supplies 100 new addresses every second at the output Am for a frequency of 100 Hz. In a variation of this embodiment, not shown, the counter 603 may change its address output once for every n oscillator 603 input signals; the line 901 in such a variation resulting from an oscillator frequency of 100 nHz. As the handle 600 is moved right, the oscillator frequency and the number of address outputs Am per second increase. At 200 Hz, line 902 indicates 200 addresses/second; and at 1,600 Hz, line 903 indicates 1,600 addresses/second. In this embodiment, the counter returns to 0 and recycles after reaching its maximum address, Am. This occurs every 10 seconds for the high speed position of the handle 600 represented by line 903 and only once every 160 seconds for the handle position indicated by line 901. The previous explanation applies equally to reverse counting caused by left-hand position of the handle 600 which supply a count down signal to the counter 603 or other appropriate mechanism, for example, as shown in the previously referenced IBM TECHNICAL DISCLOSURE BULLETIN article, Jan. 1972.

Figure 9B:
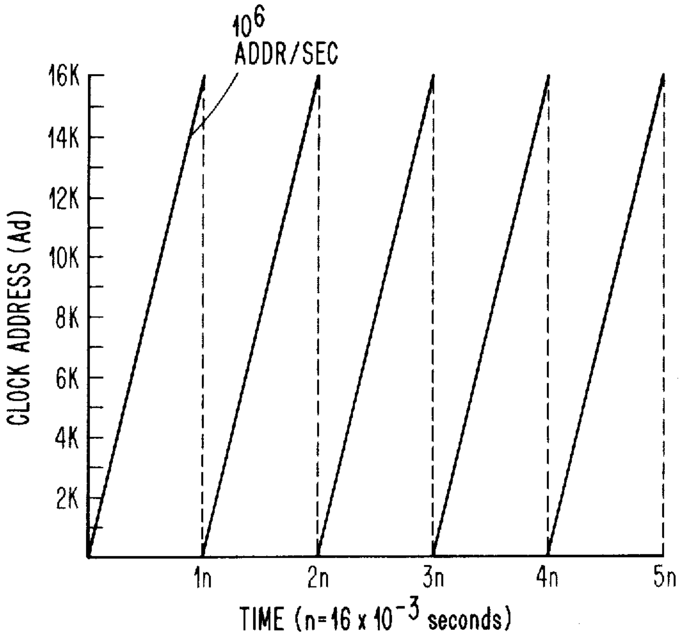

Referring to FIG. 9B, the clock counter 605 supplies clock addresses Ad as a function of clock signals 24 from the track T0 on the disc 500 at a fixed rate of 1 MHz or $10^6$ addresses per second. The counter 605 recycles back to 0 upon reaching its maximum count, every 16 milliseconds. Each cycle is represented by the letter which corresponds to one disc revolution. Sincee the clock counter is reset to start at address 0 whenever the synchronization signal 20 is read from track T1 of the disc 500, the addresses Ad are fixed relative to the recorded positions of the synchronization signal.

Figures 9C, 9D, 9E, 10:
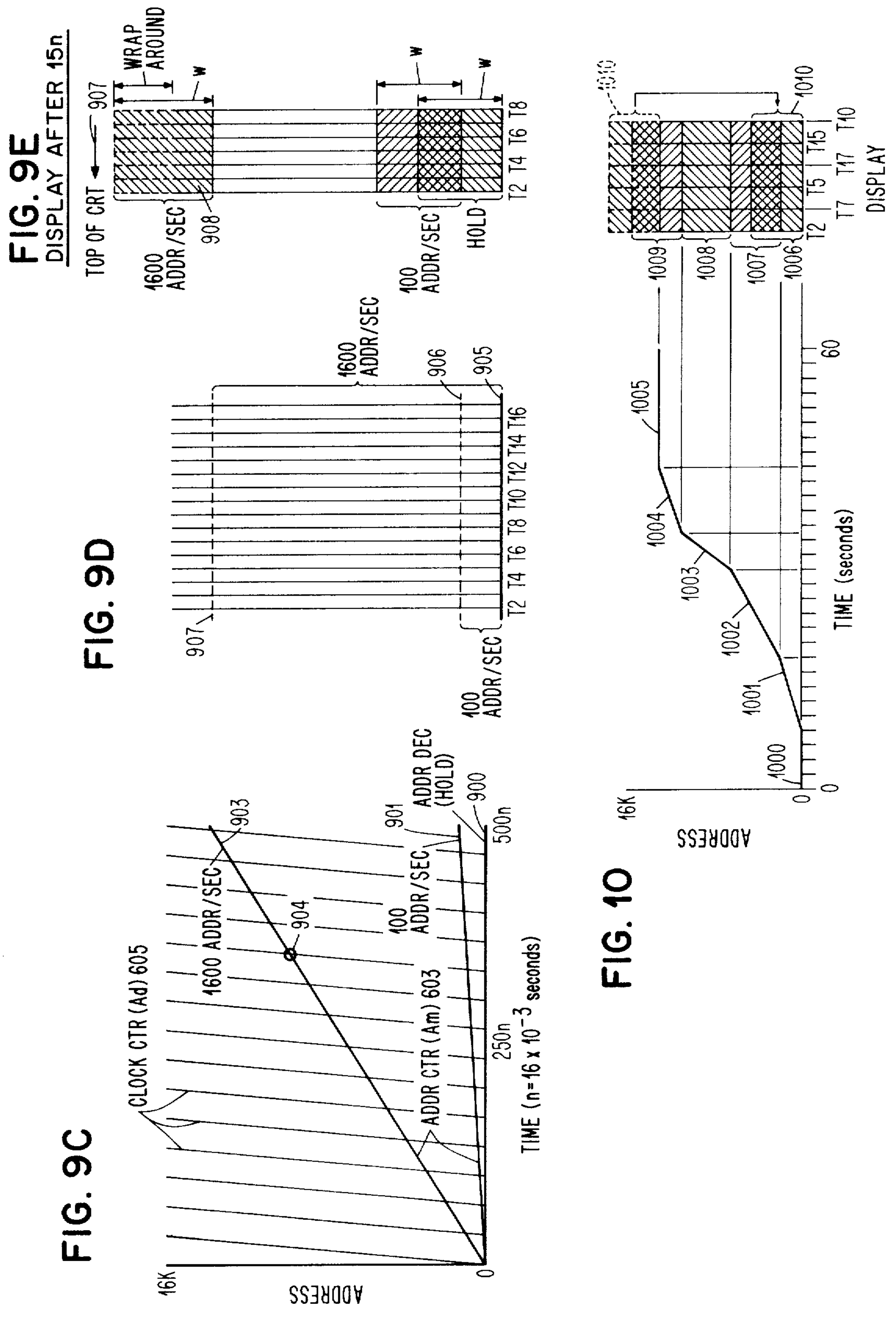
FIG. 10 illustrates a specific example of operation.

The graphs representing the address counter 603 and clock counter 605 operations are combined in FIG. 9C to illustrate examples of points on the graphs where the address counter output Am equals the clock counter output Ad, a function performed by comparator 606. Every intersection of a clock counter line with an address counter line, for example point 904, represents the occurrence of Am=Ad. Inasmuch as, in this embodiment, the disc 500 is assumed to make one revolution every 16 milliseconds, the time scale of FIG. 9C is chosen as multiples of the time ($n$) for 1 revolution. At an oscillator 602 frequency of 1,600 Hz, the point 904 represents equal addresses Am and Ad during the 320th revolution of the disc 500. Inspection of the graph indicates that each address counter graph line, for example 903, crosses the clock counter line once for each disc revolution. The address at which the crossing occurs advances each revolution as a function of the address counter graph line's slope. For example, line 903 starts at address 0 and reaches address 384 after 15 revolutions ( $15 \times \mathbf{16} \times \mathbf{10^{-3}}$ seconds).

Since movement of the handle 600 changes the oscillator 601 frequency represented by the slope of the lines 901, 903, etc., the handle directly controls the times at which the Ad=Am equalities occur. Put another way, the address counter 603 scans the disc at a rate determined by the handle position. This is shown by the graph of FIG. 9D where 16 illustrative disc tracks T2–T17 each having 16,000 locations are linearly represented relative to the 16,000 addresses Ad and Am from the counters 603 and 605. As the disc 500 revolves, the linear track representations in FIG. 9D wrap around at the 16,000 location once for each revolution. With the oscillator 602 disconnected, the address Am does not change (shown as Am=0 by line 900 in FIG. 9C), and an Ad=Am comparator 606 output occurs every revolution at the same disc location 905. When the handle 600 is advanced to increase the oscillator frequency to 1 Hz, the equality point slowly advances (1 address/second) from 905 to 906. Any available scan rate may be chosen at will by manually repositioning the handle 600, as will be explained with reference to FIG. 10 below.

The effect of the equality Ad=Am output from comparator 606 is illustrated by the graph of FIG. 9E representing signal sequence images on the display 8. Data from tracks T2  T17 is made available serially to the storage display 8 in any order desired, and simultaneously displayed on the CRT 800 face. Only a selected portion of the available data may be actually displayed, and this portion may be adjusted. The displayed portion is a window starting at a point determined by the Ad=Am equality and ending after a period determined by the CRT horizontal sweep frequency. In FIG. 9E, the top of the CRT screen is indicated by the arrow, and only the tracks T2–T8 are displayed. The signal sequences from each track are recorded by storing the disc data signal sequences and sweeping the CRT beam from left to right at a frequency considerably greater than the disc data signal rate to permit screen brightening by repeated display of each sequence. This higher frequency also limits the portion of the disc tracks actually displayed to a width $w$, which width remains constant regardless of its position relative to signal sequences. Whenever the CRT horizontal sweep begins, it will (in effect) scan a portion w of the disc track addresses. The point at which scanning begins is determined by the arrival of an "external trigger IN" signal at the horizontal amplifier 801 which is derived from the equality Ad–Am output of the comparator 606. Thus, as the handle 600 causes scanning of the disc tracks shown in FIG. 9D, there will appear on the display at time **15*n* the corresponding windows shown in FIG. 9E. When the window width $w$ is wider than the remaining signal sequences, the window wraps around, starting with address 0 as shown by window 908**.

Example of Operation of Memory Scanning Logic (FIG. 10)

FIG. 10 shows display window scanning for a variety of handle 600 positions. The display 8 screen records 6 of the 17 disc 500 tracks in an order chosen by setting the FIG. 7 switches 700 in the following order:

| Switch 700 | Set to Position |
|---|---|
| TO | 2 |
| T2 | 7 |
| T3 | 5 |
| T4 | 17 |
| T5 | 15 |
| T6 | 10 |

This causes display of only the selected six tracks in the order specified. The handle 600 is moved during 60 seconds of operation from the center hold position represented by line 1,000 to the right as represented by lines 1,001, 1,002, 1,003, then left (line 1,004) back to hold (line 1,005). Initially, the handle center hold position causes static display of disc locations in the window 1,006. Movement of the handle to increase the oscillator 602 frequency as shown by lines 1,001 (200 addresses/second), 1,002 (375 addresses/second), and 1,003 (900 addresses/second) causes increasingly rapid movement of this window so that after about 18 seconds, the window 1,007 will begin at disc address 2,000. After 30 seconds, address 6,500 will define the beginning of window 1,008. Scanning slows as the handle is moved left after about 35 seconds, window 1,009 half spanning high-end low-end disc addresses. After 45 seconds, the window 1,010 is held constant to display the same locations initially viewed with window 1,006.

The operation of the system will now be further described with reference to all of the figures. The unit under test 2 operates correctly until failure occurs in order A of register 204 causing an overflow at output 206 of the shifter 203 which is detected on monitoring probe T2. Initially, before an overflow occurs, signals from the unit under test are supplied by the monitoring probes 1 to the pulse shaper 3 and memory write circuits 9 to the memory 5 which records sequential data signals on tracks T2 through T18. Before new data is overwritten, 16.67 milliseconds of the data signals are recorded on the disc 500 in successive locations. One MHz clock signals 24 are written at 16,667 locations on track T0. If desired, the data being recorded on the memory may simultaneously appear on display 8 by way of direct data path 18 for monitoring during recording. When the error caused by the overflow condition on the line 206 is detected, a pulse-shaped signal representing an error signal is written on track T2 of the memory 5 after a delay T3 determined by variable delay 401. At this time, all recording of data signals on the memory 5 ceases. A synchronization signal is then written on track T1 from the clock track T0 after the first positive transition of the next clock signal. Whenever the synchronization signal passes the head T1, the clock counter 605 is reset, and clock signals 24 from the memory 5 step the clock counter through 16,667 addresses Ad in sequence. Depending on the position of the scanning controls 600 as explained with reference to FIG. 10, the comparator 606 and deskew delay matrix 608 will supply a compensated synchronization signal on line 26 to the display 8. The selected data is supplied to the scope in the sequence, previously given with reference to FIG. 10, determined by the data switching circuits 7. The display 8 manifests as lines the information on tracks and, as the manual control is operated, there will be displayed that portion of the tracks corresponding to a window having a width *w* and a position T relative to the recorded synchronization signal 20. Each compensated synchronization signal on line 26 defines the scanned window at a point relative to the synchronization signal on the media 500 determined by the position of the manual control.

While the invention has been particularly shown and described with reference to a preferred embodiment thereof, it will be understood by those skilled in the art that various changes in form and details may be made therein without departing from the spirit and scope of the invention.

What is claimed is:

1. A device for monitoring the operation of a tested unit, storing selected data signals indicative of operations occurring within the unit and making available for analysis data signals associated with the occurrence of an error in the tested unit, comprising:

a memory for making available data signals, stored in accessible locations, indicative of operations occurring within the unit during successive fixed time intervals;

memory reading means having at least one input connected to said memory, operable in accordance with signals received by an external control input to supply from accessed memory locations to an output, data signals stored in the accessed locations;

recording means, connected to said memory reading means output for receiving signals therefrom and recording those data signals stored in the accessed memory locations which are indicative of unit operations;

a control, connected to the memory and the recording means for variably accessing desired locations in memory for recording by aforesaid recording means; and error means connected to the memory reading means input for supplying to the control input of the memory reading means a signal to start supplying data signals subsequent to sensing an error signal indicative of the occurrence of an error in the tested unit.

2. The device of claim 1, wherein there is provided a delay circuit, between said error means and control input, adjustable to permit storage of signals to continue for an externally predetermined variable time following the occurrence of an error.

3. A tester for testing the operation of a tested unit, storing selected data and other signals indicative of operations occurring within the tested unit and making available for analysis data signals associated with the occurrence of an error signal in the tested unit, comprising:

a memory, having accessible locations, for supplying data of signals, previously recorded in a number of accessible locations, indicative of operations occurring within the tested unit during successive fixed time intervals;

circuit means, having an error signal input and an output, connected to said memory, operable upon the occurrence of an external error signal at said error signal input to supply to said output, data signals from a set of contiguous accessed memory locations;

a scanning control connected to the memory to supply at an output, signals indicating desired sets of locations for emphasized display; and a display, connected to said circuit means output and the scanning control output, for and displaying as human perceivable manifestations those signals indicative of tested unit operations which are accessed from the accessed memory locations and emphasizing those portions of the displayed manifestations indicated by the scanning control output signals.

4. The tester of claim 3, wherein the number of accessible locations in said memory determines the largest time interval of tester operation which may be monitored, data signals being stored in the memory locations continuously during tester operations, the newest data signals superseding those oldest data signals when the total number of data signals stored exceeds said number of memory locations.

5. The tester of claim 4, wherein successive data signals are continuously stored in adjacent memory locations allotted for such storage, the last data signal stored in each location superseding any signal previously stored therein, there being associated with said memory a source of repetitive clock signals, each signal being associated with a location.

6. The tester of claim 3, wherein the scanning control includes:

first means having an input connected to said memory, and an output, for supplying at the output address signals derived from signals received at the input indicative of currently accessible locations;

second means having an input and an output, for supplying at the output changing address signals selected by signals received at the input, from an external source, indicative of sets of locations desired for display; and third means, having two inputs connected, respectively, to the first and second means outputs and an output connected to the display, operable to signal said display to emphasize sets of manifestations indicative of those tested unit operations data signals which are stored in memory locations related to successful comparison of addresses from said first and second means outputs.

7. The tester of claim 5, wherein the scanning control includes:

a clock counter having an input, connected to said memory, and an output, the output continuously supplying address signals indicative of currently accessible locations derived from the clock signals received at the input;

an address counter having an input and an output, the output continuously supplying address signals, selected from signals at the input, indicating sets of locations, relative to currently displayed locations, desired for future display; and a comparator having two inputs connected, respectively, to the clock counter and address counter outputs and an equal-compare output connected to the display, operable to signal said display to start displaying a portion of the manifestations stored in the memory.

8. The tester of claim 7, wherein the address counter includes:

a manually positionable device and an electrical transducer connected to said device for supplying at the output electrical signals indicative of the device's position.

9. The tester of claim 8, wherein the manually positionable device includes a source of variable oscillator signals associated with the transducer, the rate of repetition being variable, by manual control of the transducers, relative to the repetition rate of the memory clock signals, thereby permitting scanning of a portion of the stored manifestations in accordance with the manual control by varying the time of occurrence of the equal-compare signal, and wherein the display includes an electrically scanned oscilloscope screen and additional variable duration sweep means used in varying the scanned portion size responsive to the equal-compare output from the comparator.

10. A method for monitoring the operation of a tested unit, comprising the steps of:

receiving, and storing in accessible locations, data signals indicative of operations occurring within the tested unit during successive fixed time intervals;

accessing a set of contiguous memory locations and, upon the occurrence of a tested unit malfunction, supplying to an output, data signals stored in the accessed locations;

receiving accessed signals and displaying in human perceivable form those signals indicative of tested unit operations which are stored in the accessed memory locations;

indicating desired varying sets of locations for highlighted display by said display;

specifying the direction and rate of change of the display; and changing the display in accordance with the direction and rate specified.

11. A method for monitoring the operation of a tested unit by storing selected data signals indicative of operations occurring within the tested unit and making available for display data signals associated with the occurrence of an error in the tested unit, comprising the steps of:

receiving, and storing in currently accessible locations, data signals indicative of operations occurring within the tested unit during successive fixed time intervals;

accessing a set of contiguous memory locations;

supplying to an output, the data signals stored in the accessed locations;

receiving signals and displaying as human perceivable data signals those manifestations indicative of tested unit operations which are stored in the accessed memory locations;

indicating desired varying sets of locations for display;

converting currently accessible locations to first address signals;

converting sets of locations desired for display to second address signals;

comparing the first and second address signals; and signalling said display to emphasize manifestations indicative of those tested unit operations which correspond to equal comparisons.

* * * * *

-1050
5/(?)

UNITED STATES PATENT OFFICE
CERTIFICATE OF CORRECTION

Patent No. 3,794,831 Dated February 26, 1974

Inventor(s) Richard F. Frankeny and Sidney D. Johnson

It is certified that error appears in the above-identified patent and that said Letters Patent are hereby corrected as shown below:

Column 16, line 42, "data signals those manifestations" should read --manifestations those data signals--.

Signed and sealed this 3rd day of December 1974.

(SEAL)
Attest:

McCOY M. GIBSON JR.
Attesting Officer

C. MARSHALL DANN
Commissioner of Patents